Feb. 14, 1956  W. G. SHERMAN  2,734,605
TWO-WAY FRICTION CLUTCH
Filed April 28, 1950  2 Sheets-Sheet 1
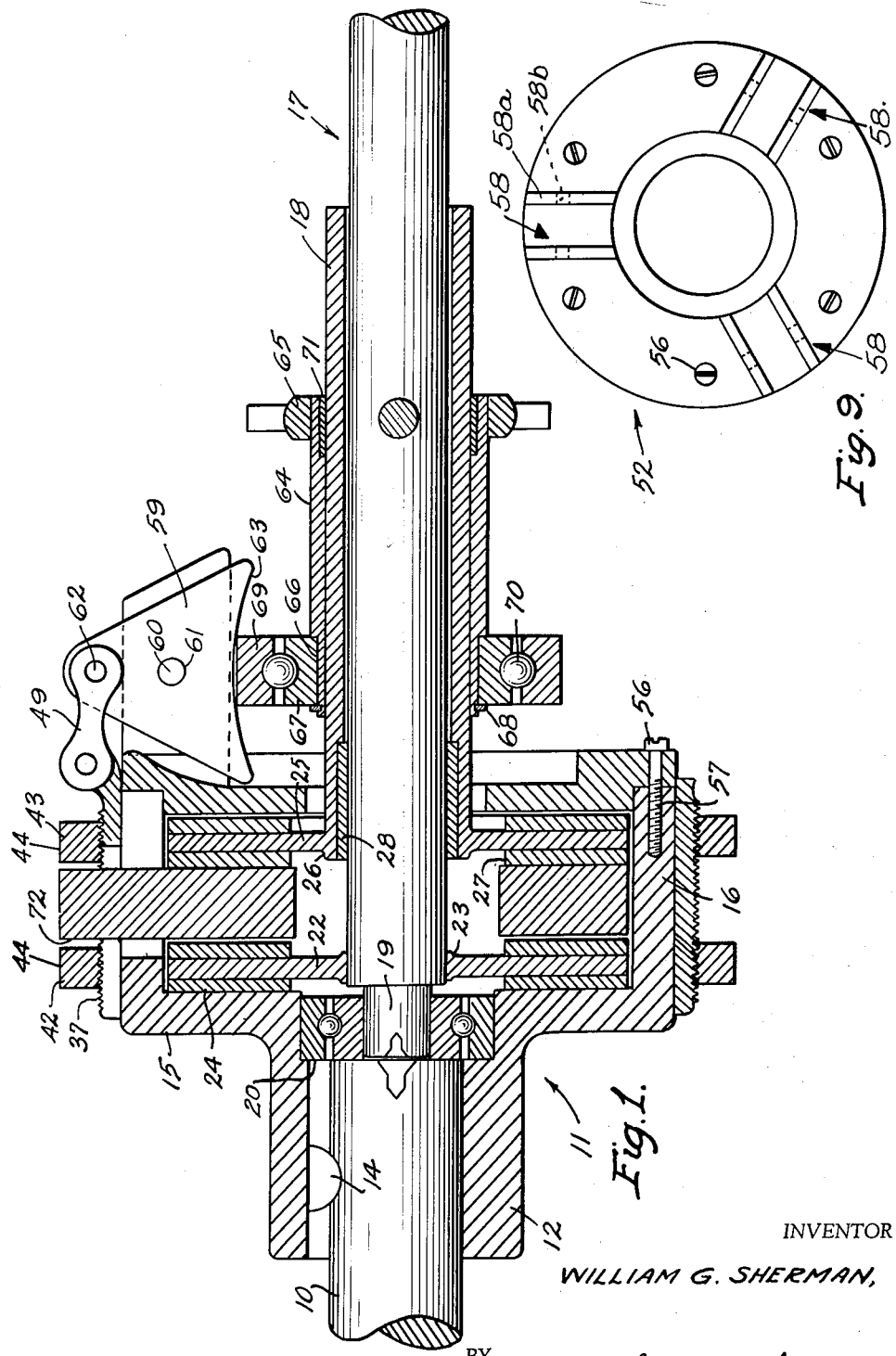
INVENTOR
WILLIAM G. SHERMAN,
BY Munn, Liddy, & Glaccum
ATTORNEY Feb. 14, 1956  W. G. SHERMAN  2,734,605
TWO-WAY FRICTION CLUTCH
Filed April 28, 1950  2 Sheets-Sheet 2
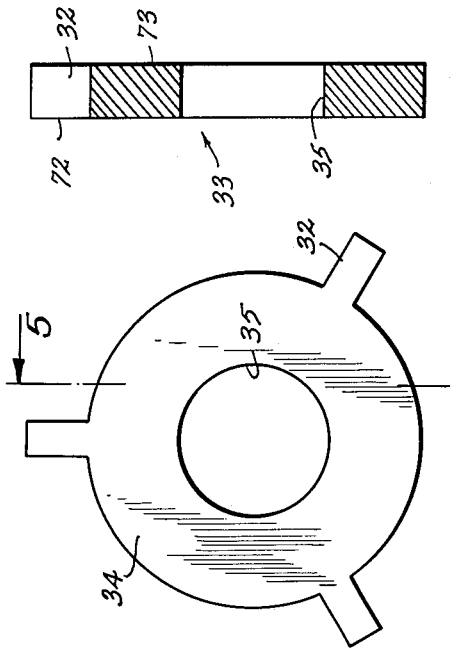
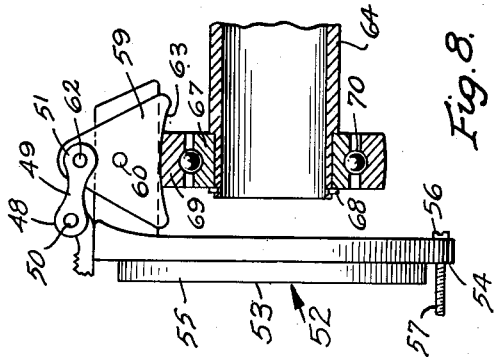
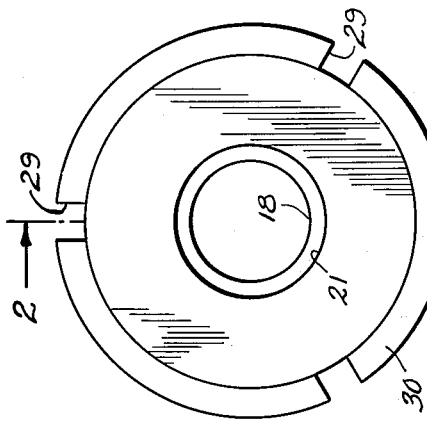
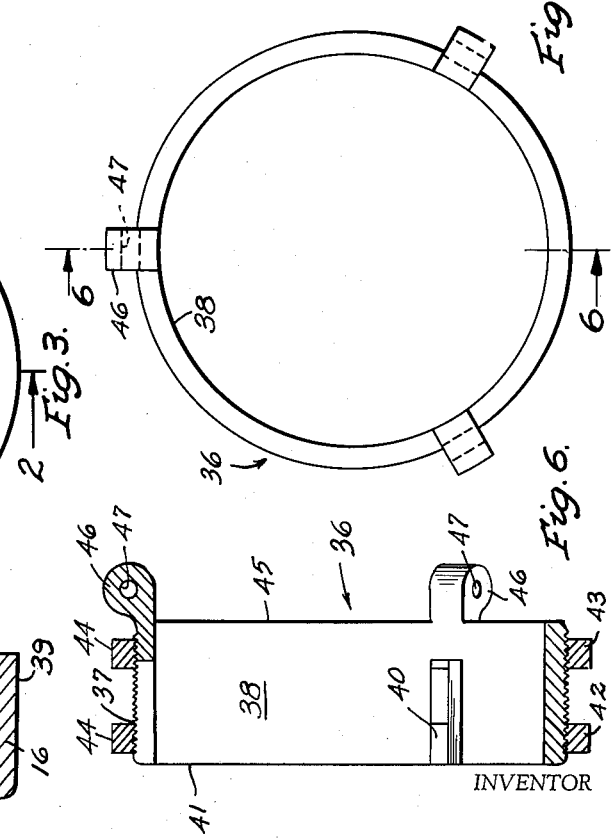
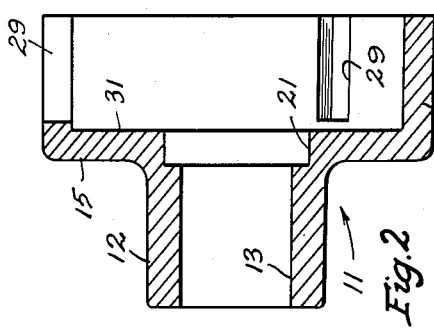
INVENTOR
WILLIAM G. SHERMAN,
BY Munn, Liddy & Glaccum
ATTORNEY

United States Patent Office 2,734,605
Patented Feb. 14, 1956

2,734,605

TWO-WAY FRICTION CLUTCH

William G. Sherman, Seattle, Wash.

Application April 28, 1950, Serial No. 158,676

19 Claims. (Cl. 192—48)

This invention relates to a clutch mechanism for effecting transmission of power between driving and driven shafts and more particularly to two-way friction clutches.

An object of the invention is to provide a new and improved clutch construction permitting control power on two concentric driven shafts whereby power derived from a power source may be distributed through either shaft to effect power combinations such as varying driving speeds or a forward, neutral and reverse drive especially suited for marine equipment. Also the present structure is very suitable for use with reduction gearing in a variety of combinations.

Another object of this invention is the provision of a mechanically loaded clutch wherein axial movement is imparted to the pressure plate by force equally applied at a plurality of points by means of adjusting nuts to shift the plate in either direction from an inoperative central position.

A further feature of my invention lies in an improved actuating mechanism for reciprocation of the drive or pressure plate, said mechanism including a cam and follower construction designed to retain the pressure plate in selected positions. In order to obviate damage to the clutch by riding of the shifter by the operator an anti-friction bearing is included in the actuating mechanism and positioned between the cam follower and the throw-out collar of the device.

Still another advantage of the invention is that the device incorporates a simple and rugged construction which permits economy in manufacture and maintenance and materially increases the serviceability of the unit. This small diameter clutch design affords a compact assembly easily accommodated in a small marine craft, but it will of course be understood that the two-way clutch is quite suitable for other uses.

Still other objects and advantages will become apparent from the following description of the present invention illustrated in the accompanying drawings, in which:

Figure 1 is a vertical sectional view through a clutch made in accordance with my invention;

Figure 2 is a sectional view taken on line 2—2 of Fig. 3;

Figure 3 is an elevational view of the drive shell shown in Fig. 2;

Figure 4 is an elevational view of the pressure plate used with my invention;

Figure 5 is a sectional view taken on the line 5—5 of Fig. 4;

Figure 6 is a sectional view taken on line 6—6 of Fig. 7;

Figure 7 is an elevational view of the threaded tube shown in Fig. 6.

Figure 8 is an elevational view partly in cross section showing a back plate, a throw-out collar and associated parts.

Figure 9 is an elevational view of the back plate used with my invention.

Referring first to Figure 1 of the drawing it will be seen that rotational power is introduced to the clutch mechanism by means of a drive shaft 10 activated at one end by a conventional source of power such as an internal combustion engine or the like. Associated with the end of drive shaft 10 is a drive shell shown generally at 11 in Figures 1 and 2 of the drawings. This drive shaft has an elongated central hub portion 12 having an axial passage 13 therethrough of such diameter as to slidingly receive the drive shaft 10. Shell 11 and drive shaft 10 are secured together by a key means 14 or the like to prevent relative rotation between these two elements.

The actual shell portion of element 11 is located at one end of the elongated hub 12 and consists of a radial flange 15 having formed at the periphery thereof an annular ring 16 extending at right angles thereto and co-operating with the flange 15 to form a recess or cup structure adapted to receive the friction disc elements of the clutch mechanism.

The driven elements of this clutch mechanism consist of a central drive shaft 17 and a concentric driven sleeve or tube 18. The axis of concentric members 17 and 18 is of course an extension of the axis of the drive shaft 10. The free end of shaft 17 has a reduced portion 19 thereon which is journaled within a conventional pilot bearing 20 which is retained within the countersunk annular recess 21 formed at the intersection of hub 12 and radial flange 15 of the drive shell element. To the extreme left end of the main body portion of driven shaft 17 there is secured a radially extending disc plate 22. The disc plate 22 has a slightly enlarged hub portion 23 which surrounds the driven shaft and is secured thereto to prevent relative rotational movement between the clutch disc 22 and driven shaft 17. Attached to each face of the disc 22 is a conventional friction pad or facing ring 24. As is common practice the right end of shaft 17 is connected to driven elements through spline or other connections which permit axial movement.

A similar radial disc 25 has a hub portion 26 attached to the outer periphery of the previously mentioned driven tube 18. Disc 25 also has friction facings 27 the function of which will be explained in detail hereinafter in this specification. At this point it should be noted that the driven sleeve 18 and driven shaft 17 are held in axial alinement by means of a bearing ring 28 which is press fitted into an annular recess formed in the inner periphery of sleeve 18. The ring 28 is of course manufactured from any convenient wear resistant metallic alloy. The right hand end of shaft 18 is connected to driven elements through spline or other connections which permit axial movement of sleeve 18 in a manner common in the art.

It will be seen from Figures 2 and 3 of the drawings that the annular flange 16 of the drive shell is provided with three elongated slots 29 running parallel to the longitudinal axis of the drive shell and having their centers equally spaced at 120° around flange 16. Slots 29 open into the vertical face 30 of annular flange 16 and extend inwardly to a point just short of the inner face 31 of radial flange 15.

Slots 29 are adapted to receive the radial legs or fingers 32 of a pressure plate or drive spider 33 shown in Figures 4 and 5 of the drawings. The pressure plate 33 has a ring-like body portion 34 in which there is formed a central aperture 35 through which passes the driven shaft 17 when the unit is assembled as shown in Figure 1. Projecting outwardly from the outer periphery of ring 34 are the above mentioned legs 32. The legs 32 have their center lines equally spaced about the periphery of the pressure plate at angles of 120° thereby allowing these legs to slide axially into slots 29 thereby locking the pressure plate to the drive shaft 11 for driving rotation of the pressure plate by the shell member. It is of course obvious that the outer periphery of the ring portion 34 is of a diameter slightly less than the inner periphery of flange 16 in order that the ring portion of the pressure plate may slide within the cup formed by the flanges 15 and 16 of the drive shell.

It will thus be seen that as the drive shell rotates its rotational power is transmitted to the pressure plate by means of legs 32 and therefore by merely shifting the pressure plate axially in one direction or the other from a neutral central position a selected friction disc will be engaged by the pressure plate and accordingly transmit the power to either the shaft 17 or sleeve 18 as desired.

The mechanism for effecting axial movement of the pressure plate 33 is an important feature of my invention and consists of a simple and efficient assembly of elements. As best seen in Figures 6 and 7 of the drawings I provide a sleeve member 36 which consists basically of an annular ring having its outer periphery threaded as at 37, the inner periphery 38 of sleeve member 36 is of a slightly greater diameter than the outer periphery 39 of flange 16 of the drive shell member. This enables the sleeve 36 to slide over the drive shell and substantially enclose the cup portion defined by flange 16. The sleeve 36 is also provided with three longitudinal slots 40 which open into the face 41 of the sleeve and extend inwardly in a direction parallel to the axis of the sleeve to a point spaced from the opposite face of the sleeve member. The slots enable sleeve 36 to receive legs 32 of the pressure plate to take its position in the assembly as shown in Fig. 1. Actual contact with the pressure plate to move it axially whereby it will contact one of the friction discs is accomplished selectively by one of two adjusting nuts 42 and 43 shown in Figs. 1 and 6. Each adjusting nut is a ring member having a smooth or knurled, if desired, outer periphery 44 and having threads formed on the inner periphery thereof. These threads are equal in pitch to the external threads formed on the sleeve 36 in order that each adjusting nut may be successively threaded over the sleeve. Thus it will be seen that adjusting nuts 42 and 43 may be positioned on the sleeve 36 so that they will impart the shifting movement of sleeve 36 to the legs 32 of the pressure plate. Nut 43 is threaded on sleeve 36 before assembling sleeve 36 with the drive shell and other associated elements. This permits an even pressure to be applied to the pressure plate at three points equally spaced around said plate and accordingly an equal and symmetrical contact is available between the pressure plate and the selected friction disc. By making the abutment rings 42 and 43 adjustable on the sleeve 36 it is possible to control axial shifting of the pressure plate to that position which will most effectively transfer rotational power from the pressure plate to the friction discs. In other words an undue amount of pressure could be placed on the friction discs by the pressure plate, or on the other hand there is a possibility that the pressure plate would not shift a sufficient distance to apply adequate pressure to engage the driving elements with the friction discs. Therefore it will be readily seen that the fine adjustment afforded by the adjusting nuts 42 and 43 permit the mechanism to be set in an exact position whereby the most effective contact pressure exists between the pressure plate and the driving discs.

The clutch disks and sleeve 36 have common centers of rotation with portions of the sleeve being in the radial plane of the disks (the plane which extends transversely of the axis of the disks and sleeve). Ring 43 likewise has a center common to the center of disk 25 and ring 42 has a center common to disk 22. Thus the rings lie in the radial planes of the respective disks. Further, the rings are concentrically positioned with respect to portions of the sleeve (has a common center therewith), and thus lie in the radial plane of the portions of the sleeve with which they are respectively concentric.

Referring once more to Figures 6 and 7 of the drawings it will be seen that the end face 45 of sleeve 36 is provided with male lugs 46 having their centers equally spaced at angles of 120° about sleeve 36. Each lug 46 has a transverse aperture 47 extending completely therethrough. Each lug 46 is received within the bifurcated end 48 of an operating link 49, the opposite prong of end 48 having alined apertures and a retaining pin is inserted into these apertures and aperture 47 of the lug to pivotally connect the link to sleeve member 36. The opposite ends of links 49 are also bifurcated and contain alined apertures for connecting the link to a cam member to be explained in greater detail hereinafter in the specification. Figure 9 shows a back plate 52 which is adapted to cover the open end of the cup portion of the drive shell 11 as shown in Figure 1. The inner face 53 of the back plate is recessed so as to form an annular shoulder 54. The shoulder 54 engages the vertical face of flange 16 of the drive shell and the reduced central portion 55 fits within the inner periphery of the above mentioned drive shell. A plurality of screws 56 are spaced about the back plate and are received by threaded apertures 57 formed in the vertical face of the drive shell. This permits the back plate to be secured to the open end of the drive shell thus encasing the opposed friction discs. The opposite face of the back plate is provided with three projecting elements generally indicated as 58 each of which is bifurcated or slotted as shown in Figure 9 to present opposing arms 58a, each pair of which have alined apertures 58b extending therethrough. The forked projecting elements 58 are also evenly spaced about the back plate 52 having their center lines at successive angles of 120° about the plate. Fitting between the arms of each forked member 58 is a cam member 59 generally triangular in shape. Each cam is pivotally retained in place by means of a pin 60 passing through the above apertures 58b and an aperture 61 formed on the vertical axis of the cam. A second aperture is formed in cam 59 near the apex thereof and receives the pivot pin 62 which passes through the alined apertures in the bifurcated end 51 of the link and pivotally connects the cam and link. The base or lower edge 63 of each cam member is of arcuate configuration.

In order to activate cam member 59 the shifting mechanism best shown in Figures 1 and 8 is utilized. This mechanism consists basically of a throw-out collar or tube 64 having brazed to its outer end the hub of a shifter band 65. It will of course be understood that reciprocating motion is applied to the shifter band by means of a conventional shift lever to be manipulated by the operator. The inner end of collar 64 contains an annular recess 66 which acts as a seat for the inner race member of an anti-friction bearing assembly. This inner race 67 slides over the reduced portion of collar 64 and is retained in place by means of a snap ring 68 or the like. An outer race member 69 is separated from the inner race member by means of a plurality of spherical bearings 70. It should be noted at this point that by so locating this anti-friction bearing means riding of the shifter will not result in damage to the mechanism. This is an important feature and materially increases the useful life of my two-way clutch.

From Figures 1 and 8 of the drawings it will be seen that the outer periphery of race member 69 is in the form of a flat surface. The cooperation of this surface with the comparatively arcuate edge 63 of the cam has a tendency to retain the cam follower 69 in position at the center or at the outer end of the cam. It should be further noted that a wear resistant bearing ring 71 is positioned between the throw-out collar 64 and the driven sleeve 18 as best seen in Fig. 1 of the drawing.

In the operation of the invention the neutral or inoperative position of the clutch mechanism is shown in Figure 1 of the drawing. This neutral position occurs when the cam follower 69 is in the center portion of the arcuate cam edge 63. When it is desired to transmit the driving power to the driven sleeve element 18 the shifter band 65 is moved to the left as viewed in Fig. 1. This accordingly causes the cam follower 69 to travel to the left along the edge 63 of the cam member 59. This causes the left hand edge of the cam to rise thereby pivoting the cam member about its central pivot end 60. As the cam 59 is thus rotated clockwise the apex of the cam moves to the right carrying with it the link 49 and its attached sleeve member 36. Pressure is thus brought to bear on the faces 72 of each radial leg 32 on the pressure plate. This causes the pressure plate to also move to the right whereby the disc 25 and its oppositely disposed friction facings 27 are engaged by the right hand face 73 of the pressure plate and the inner face 53 of back plate 52. Since the pressure plate and the back plate are both secured for rotation to the drive shell 11 they are accordingly rotating with an equal speed and their frictional engagement with friction disc 25 transfers similar rotation to the driven sleeve 18.

When it is desired to transmit the driving power to the inner shaft 17 the shifter mechanism is then moved axially to the right as viewed in Figure 1. This causes the cam follower 69 to raise the right hand end of cam 59 and accordingly move link 49 and sleeve 36 to the left. With this operation the adjusting nut 43 comes into contact with surface 73 of the pressure plate causing said pressure plate to move to the left thereby engaging friction disc 22 and causing this friction disc to also engage the inner surface 31 of the drive shell. Thus rotation of drive shell 11 and pressure plate 33 is imparted to the friction disc which in turn rotates driven shaft 17.

From the foregoing description of the present invention it will be seen that I have provided a simplified and effective mechanism for two-way transmission of power from a driving element to two driven elements. The design of the cam actuating mechanism is such that riding of the shifter by the operator is anticipated and the specific location of the anti-friction bearings prevents damage to the clutch structure. Furthermore longitudinal pressure is applied to the pressure plate evenly to assure even wearing of the friction discs. Minute adjustment of the reciprocating mechanism is permitted with the use of the opposing adjusting nuts.

While a preferred form of the invention has been shown and described, it will be understood that variations in details of form may be made without departure from the invention as defined in the appended claims.

I claim:

1. In a clutch mechanism the combination of a driving shaft, a driven shaft and a concentric driven sleeve surrounding said driven shaft, a clutch disc fixed to said driven shaft and a clutch disk connected to said driven sleeve, a drive shell connected to said driving shaft and having an annular flange encircling said discs, said flange having slots therein, a drive spider within said flange and having legs passing through said slots, said spider being positioned between said clutch discs, a back plate connected to one end of said annular flange, an externally threaded sleeve slidably mounted on the periphery of said drive shell and having slots therein adapted to receive the legs of said drive spider, spaced adjusting nuts threaded on said last mentioned sleeve, and an actuating means for reciprocating said threaded sleeve with respect to the drive shell, to effect alternate engagement of said nuts with said drive spider.

2. In a clutch mechanism the combination of a driving member, a driven shaft and a concentric driven sleeve surrounding said shaft, a cup-shaped shell fixed to said driving member and having an annular flange with a plurality of slots therein, a centrally apertured pressure plate within said shell and having radially extending legs passing through said slots, a centrally apertured back plate secured to the open end of said cup-shaped shell, clutch discs secured to the driven shaft and driven sleeve, said discs lying within said shell and being positioned on opposite sides of said pressure plate, an externally threaded sleeve slidably mounted on the periphery of said drive shell and having slots therein adapted to receive said legs, spaced internally threaded rings positioned on said last mentioned sleeve on opposite sides of said legs, the space between said rings being greater than the width of said legs, and means for reciprocating said last mentioned sleeve to reciprocate said pressure plate.

3. In a clutch mechanism the combination of a driving member, a driven shaft and a concentric driven sleeve surrounding said shaft, a clutch disc, fixed to each of said shaft and driven sleeve, a drive shell connected to said driving member and having an annular flange encircling said discs, said flange having slots therein, a drive spider within said flange and having legs passing through said slots, said spider being positioned between said clutch discs, a back plate connected to one end of said annular flange, an externally threaded sleeve slidably mounted on the periphery of said drive shell and having slots therein adapted to receive the legs of said drive spider, spaced adjusting nuts threaded on said last mentioned sleeve, a plurality of cam members pivotally attached to said back plate, a link connecting each of said cams to said threaded sleeve, and means for pivoting said cams to reciprocate said threaded sleeve whereby the drive spider is selectively moved against one of the clutch discs.

4. In a clutch mechanism the combination of a driving member, a driven shaft and a concentric driven sleeve surrounding said shaft, a clutch disc, fixed to each of said shaft and driven sleeve, a drive shell connected to said driving means and having an annular flange encircling said discs, said flange having slots therein, a drive spider within said flange and having legs passing through said slots, said spider being positioned between said clutch discs, a back plate connected on one end of said annular flange, an externally threaded sleeve slidably mounted on the periphery of said drive shell and having slots therein adapted to receive the legs of said drive spider, spaced adjusting nuts threaded on said last mentioned sleeve, a plurality of cam members pivotally attached to said back plate, a link connecting each of said cams to said threaded sleeve, an arcuate surface on each cam, a throw-out collar slidably mounted on said driven shell, an anti-friction bearing mounted on the periphery of said collar and contacting said arcuate surfaces to pivot the cam members upon reciprocation of the collar.

5. In a clutch mechanism the combination of a driving member, a driven shaft and a concentric driven sleeve surrounding said shaft, a clutch disc, fixed to each of said shaft and driven sleeve, a drive shell connected to said driving means and having an annular flange encircling said discs, said flange having slots therein, a drive spider within said flange and having legs passing through said slots, said spider being positioned between said clutch discs, a back plate connected on one end of said annular flange, an externally threaded sleeve slidably mounted on the periphery of said drive shell and having slots therein adapted to receive the legs of said drive spider, spaced adjusting nuts threaded on said last mentioned sleeve, a plurality of cam members pivotally attached to said back plate, a link connecting each of said cams to said threaded sleeve, an arcuate surface on each cam, a throw-out collar slidably mounted on said driven shell, a ball-bearing race having an inner ring secured to said collar and an outer ring contacting the arcuate surface of said cam members, the periphery of said outer ring being a flat surface, and a plurality of ball-bearings between said race rings.

6. In a clutch mechanism the combination of a driving member, a driven shaft and a concentric driven sleeve surrounding said shaft, a clutch disc, fixed to each of said shaft and driven sleeve, a drive shell connected to said driving member and having an annular flange encircling said discs, said flange having slots therein, a drive spider within said flange and having legs passing through said slots, said spider being positioned between said clutch discs, an externally threaded sleeve slidably mounted on the periphery of said drive shell and having slots therein adapted to receive the legs of said drive spider, means for reciprocating said threaded sleeve with respect to the drive shell, and means adjustable on the threaded sleeve for contacting the legs of said spider upon movement of said sleeve to reciprocate the spider to engage said clutch discs.

7. In a clutch mechanism having a clutch disc and a movable pressure plate, a means for shifting said pressure plate against said disc comprising a shiftable sleeve, at least a portion of said sleeve lying in the radial plane of the clutch disk, and a ring in threaded engagement with said shiftable sleeve, said ring engaging said pressure plate upon movement of said shiftable sleeve so as to cause said pressure plate to move against said disc.

8. In a clutch mechanism having a clutch disc and a movable pressure plate, a means for shifting said pressure plate against said disc comprising a sleeve slidable with respect to said pressure plate and said clutch disc and a ring having threaded engagement with said sleeve, said ring engaging said pressure plate so as to move said pressure plate against said disc upon movement of said sleeve, at least a portion of said sleeve lying in the radial plane of said clutch disk, and said ring lying in the same radial plane of a portion of said sleeve.

9. In a clutch mechanism having a clutch disc and a movable pressure plate, a means for shifting said pressure plate against said disc comprising a shiftable sleeve and a ring in engagement with said sleeve, said ring engaging said pressure plate upon movement of said shiftable sleeve so as to cause said pressure plate to move against said disc, said ring being out of engagement with said pressure plate when said clutch is in disengaged position.

10. In a clutch mechanism having a clutch disc and a movable pressure plate, a means for shifting said pressure plate against said disc comprising a sleeve slidably mounted with respect to said plate at least a portion of said sleeve lying in the radial plane of said clutch disk, a ring member concentrically mounted upon said sleeve so as to be adjustable with respect to said sleeve and said pressure plate, said ring member engaging said pressure plate upon sliding movement of said sleeve.

11. In a clutch mechanism, a driving member, a driven member, a sleeve concentric with said driven member, a clutch disc plate fixed to said driven member, at least a portion of said sleeve lying in the radial plane of said clutch disk, a pressure plate movable against said disc plate and driven by said driving member, said sleeve being movable with respect to said pressure plate and said disc plate, said sleeve having a ring concentrically mounted thereon for engagement with said pressure plate upon movement of said sleeve.

12. In a clutch mechanism having a driving member, a driven member, and a clutch pressure plate driven by said driving member, a disc mounted on said driven member, a sleeve member slidably mounted on said driving member, and a nut mounted on said sleeve and concentric with respect to said sleeve and lying in the radial plane of a portion of said sleeve, said sleeve having a portion lying in the radial plane of said disk, said nut engaging said plate upon sliding movement of said sleeve so as to cause said plate to engage said disc.

13. In a clutch mechanism having driving members, a driven member, a clutch plate driven by said driving members, a clutch disc fixedly mounted on said driven member and concentric therewith, a sleeve slidably mounted on said driving members, said sleeve having a ring concentric therewith, said ring engaging said plate so as to move said plate against said disc upon sliding movement of said sleeve, said ring being out of engagement with said pressure plate when said clutch is in disengaged position.

14. In a clutch mechanism having a driving member, a driven member, a drive shell connected to said driving member, a pressure plate driven by said drive shell, a clutch disc fixed to said driven member, a sleeve slidably mounted upon said shell and concentric of said disc, a portion of said sleeve lying in the radial plane of said disk, a ring concentrically mounted upon said sleeve and adjustable with respect thereto, said ring engaging said pressure plate upon sliding movement of said sleeve so as to force said plate against said disc.

15. In a clutch mechanism, having a driving member, a drive shell connected thereto, a pressure plate slidable on said shell and concentrically mounted with respect thereto, a driven member having a clutch disc fixedly secured thereto, a sleeve slidably mounted on said shell and concentric therewith, a portion of said sleeve lying in the radial plane of said disk, a ring, means adjustably securing said ring to said sleeve concentrically with respect to said sleeve, said ring engaging said pressure plate upon sliding movement of said sleeve so as to force said plate into engagement with said disc.

16. The device of claim 15 in which said adjustable securing means comprises a thread on said sleeve and a thread on said ring.

17. The device of claim 15 in which said adjustable securing means comprises a thread on the external surface of said sleeve, said ring having a thread in engagement with said thread on said sleeve.

18. A clutch mechanism comprising a drive shell structure, a drive spider slidably mounted in said structure, a shiftable sleeve slidably mounted on said drive shell and slidably receiving said drive spider and a ring adjustably connected to said sleeve, and engageable with said drive spider upon sliding movement of said sleeve on said drive shell.

19. In a clutch mechanism, the combination of a driving member, a driven shaft, a clutch disk fixed to said shaft, a drive shell connected to said driving member and having an annular flange encircling said disk, said flange having slots therein, a drive spider within said flange and having legs passing through said slots, said spider being positioned adjacent said clutch disk, an externally threaded sleeve slidably mounted on the periphery of said drive shell and having slots therein adapted to receive the legs of said drive spider, means for reciprocating said threaded sleeve with respect to the drive shell, means adjustable on the threaded sleeve for contacting the legs of said spider upon movement of said sleeve to reciprocate the spider to urge the spider against said clutch disk.

References Cited in the file of this patent

UNITED STATES PATENTS

| | | |
|---|---|---|
| 2,168,960 | Morris | Aug. 8, 1939 |
| 2,277,273 | Spase | Mar. 24, 1942 |
| 2,407,319 | Miller | Sept. 10, 1946 |
| 2,443,901 | Fast | June 22, 1948 |
| 2,462,457 | Berndtson | Feb. 22, 1949 |
| 2,551,939 | Gerst | May 8, 1951 |
| 2,573,135 | Gerst | Oct. 30, 1951 |